May 30, 1939.  H. A. FORE ET AL  2,160,356
GEOPHYSICAL INSTRUMENT
Filed Sept. 28, 1937   3 Sheets-Sheet 1
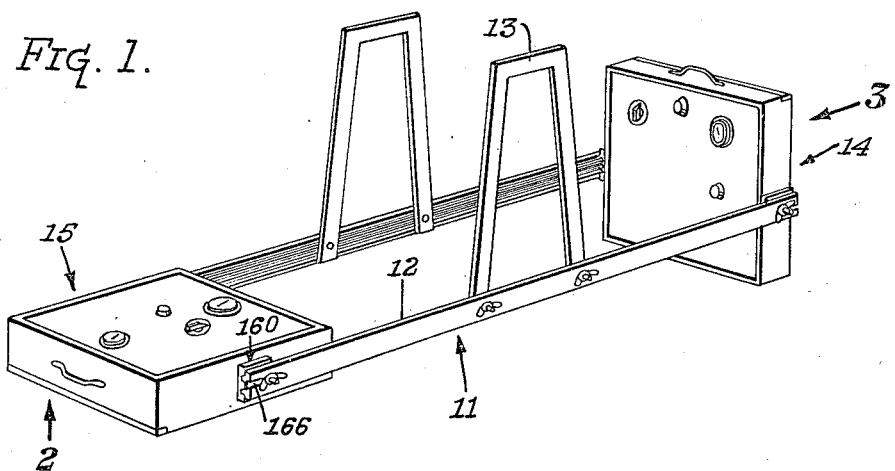
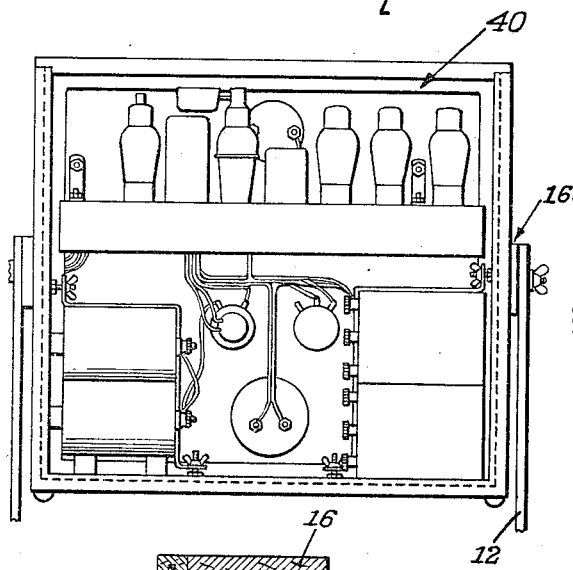
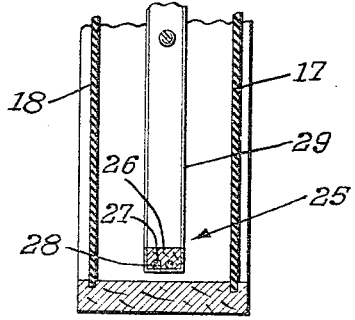
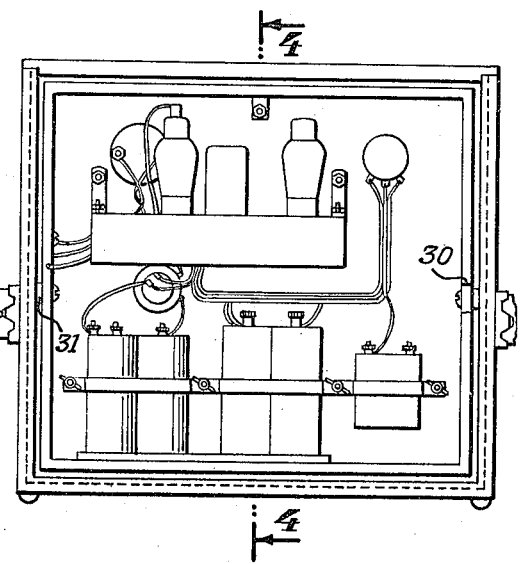
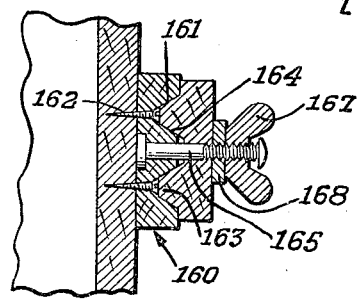
Inventors.
H. A. Fore
A. K. Edgerton
By Hazard and Miller
Attorneys.

May 30, 1939.   H. A. FORE ET AL   2,160,356
GEOPHYSICAL INSTRUMENT
Filed Sept. 28, 1937   3 Sheets-Sheet 2
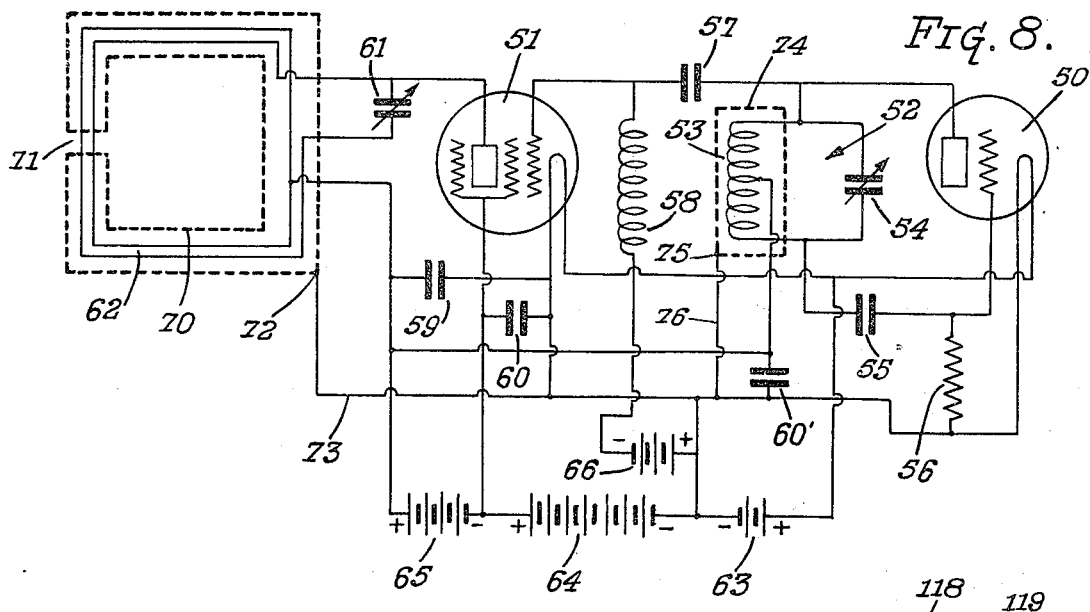
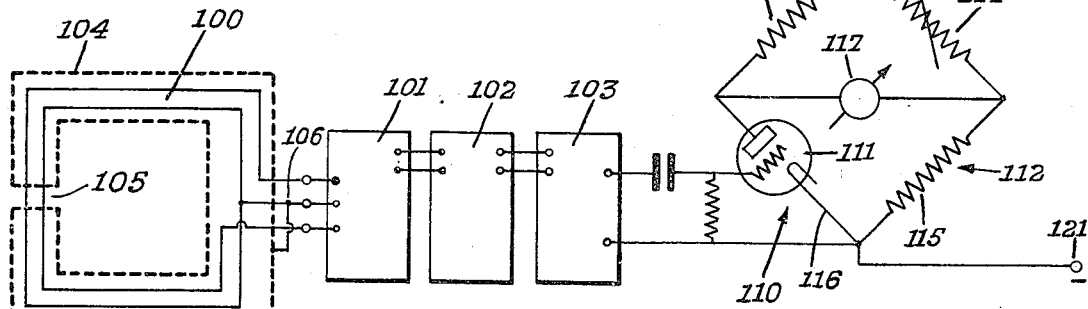
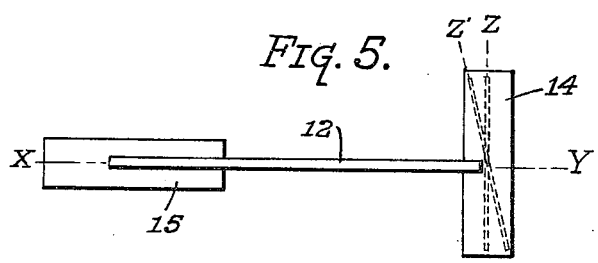
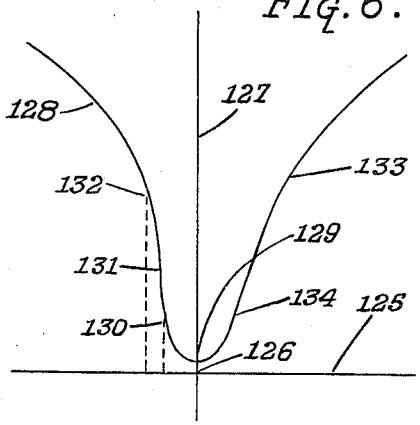
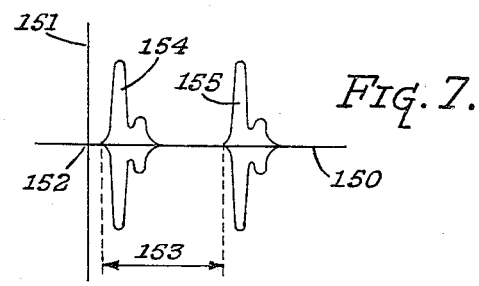
Inventors.
H. A. Fore
A. K. Edgerton
By Hazard and Miller
Attorneys.

May 30, 1939.  H. A. FORE ET AL  2,160,356

GEOPHYSICAL INSTRUMENT

Filed Sept. 28, 1937  3 Sheets-Sheet 3

Inventors.
H. A. Fore
A. K. Edgerton
By Hazard and Miller
Attorneys.

Patented May 30, 1939

2,160,356

UNITED STATES PATENT OFFICE 2,160,356

GEOPHYSICAL INSTRUMENT

Harry A. Fore and Albert K. Edgerton,
Los Angeles, Calif.

Application September 28, 1937, Serial No. 166,111

6 Claims. (Cl. 175—182)

Our invention pertains to a geophysical instrument of a type utilizing electromagnetic radiations propogated from a radio transmitter and influencing a radio receiver. Both the transmitter and receiver employ loop antennae.

In this manner of making geophysical investigations there are a number of features or factors which it is desirable to overcome and along which line this invention has been developed. For instance, the operation of such an instrument should be as independent as possible from the electrostatic capacity variations between the instrument and surrounding objects such as the ground being explored, or the body of the operator. To accomplish this result in our invention we use the loop type inductances for the antennae which have certain special electrical and mechanical properties. By using a coil or loop of relatively high distributed capacity, the variations in capacity to ground and surrounding objects due to changes in position of the instrument are reduced to a practical minimum. By the use of suitable metallic electrostatic shielding of either the transmitter or receiver loop antenna or both, we may provide a constant electrostatic capacity which is high compared with the variations in capacity to ground and surrounding objects due to changes in position of the instrument. Another factor resulting from the shielding of the loops is, that these may be wound in any desired cross-section such as one of high distributed capacity or one whose figure of merit $$\left(Q = \frac{WL}{R}\right)$$

is high such as a conventional single layer winding, and still be free from the aforementioned capacity troubles.

Another effective way of overcoming the electrostatic capacity difficulty is by use of tuned loop antennae circuits which use a very high capacity and a correspondingly low inductance loop. Such tuned loop antennae thus present a high constant lumped electrostatic capacity compared with the variations in capacity to ground and surrounding objects occurring with changing position of the instrument.

One of these three types of antennas is augmented by the use of a specially designed receiver having high sensitivity and a voltmeter of novel design. This voltmeter incorporates the characteristic of relatively high voltage sensitive compensation for residual plate current, protection of the meter against overload, and compensation for initial constant current.

It is also desirable to develop a good null, that is a minimum indication in the receiver and a good operating curve. Some of the characteristics which effect this are as follows: When loop antennae are used at very short distances as in our instrument, the size of the loop is an appreciable percentage of the distance from the transmitter, thus two factors negligible in the more familiar direction finding use become important. The field strength reduces rapidly as the radius about the transmitter increases, according to an exponential function. Due to the field being generated from a loop antenna and the field suffering distortion from metal mounted in the field, the inverse square law holds only approximately. However, it may be readily seen that the field strength at the leading edge of the receiving loop is much greater than that at the edge away from the transmitter. Also, the radius of curvature of the energizing field is small and less at the leading edge than at the back edge of the loop. Now, the terminal voltage of the loop is the result of phase differences in the voltages produced in the opposite legs, plus the differences in voltages caused by decreasing field strength with increasing radius, and changing radius of curvature. Hence, we find that the shape of the windings of the loop antenna becomes of prime importance to successful operation of loop antenna at short range. We find that the more nearly the loops are wound in one plane or "pancake" form the more effective they become both from the standpoint of width or null angle and from the minimum signal value. The shape of the loop is immaterial as to whether it is round, square, or otherwise, so far as this effect is concerned.

Our invention is illustrated in connection with the accompanying drawings, in which:

Figure 1 is a perspective view showing a suitable carrying frame with the transmitter and receiver assembly located in boxes at opposite ends of the frame.

Fig. 2 may be considered as an underside view of the receiver taken in the direction of the arrow 2 of Fig. 1 with the cover panel removed.

Fig. 3 may be considered as an elevation of the transmitter taken in the direction of the arrow 3 of Fig. 1 with the cover panel removed.

Fig. 4 is a detail vertical longitudinal section through the transmitter on substantially the section line 4—4 of Fig. 3, illustrating the devices for pivoting the loop antenna and obtaining a vernier type of adjustment for the angularity of the antenna in reference to the plane of the receiver loop antenna.

Fig. 5 is a diagram to illustrate the manner of adjusting the transmitter loop antenna in reference to the receiver loop antenna without changing the position of the other electrical elements.

Fig. 6 is a diagram illustrating the instrument operating curve.

Fig. 7 is a diagram of an oscillogram of suitable wave form which may or may not be amplified by linear amplification.

Fig. 8 is an electrical diagram of the transmitter and indicating the shielding of the transmitter antenna loop.

Fig. 9 is an electrical diagram of the receiver circuit with the volt meter tube included as one leg of a Wheatstone bridge.

Fig. 10 is a detail of the attachment of the handles.

Figure 11:
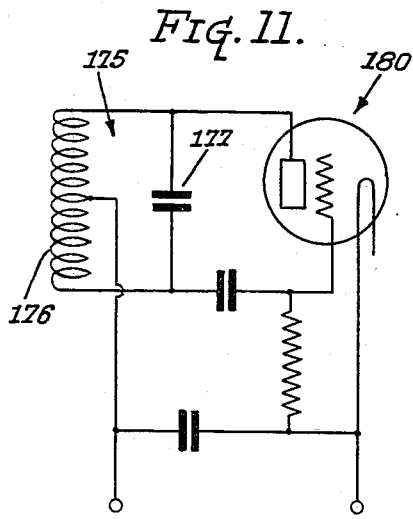
Fig. 11 is an electrical diagram of a transmitter loop circuit having a high capacity condenser and low inductance in the loop.

Our invention as to the mechanical feature is substantially as follows, having reference particularly to Figs. 1 through 5. In this we employ a supporting or carrying frame 11 having two longitudinal bars 12 with extension handles 13 to facilitate lowering the instruments close to the ground. The transmitter 14 has the electrical equipment incorporated in a box and at the opposite end is located the receiver 15, the electrical elements also being incorporated in a similar box. For convenience the transmitter has the box positioned vertically and the receiver horizontally as to the handles. Thus this locates the transmitter loop in a substantially vertical plane and the receiver loop in a horizontal plane when the device is being carried, the frame being held horizontal. For convenience the boxes have an outside wall 16, a fixed side panel 17 and a removable panel 18.

As in each of the constructions the loop antennas and their manner of mounting are important, these may be described by referring to the transmitter antenna 25. This is mounted in a wood rectangular frame 26 having preferably a plurality of grooves 27 spaced apart and extending around the periphery of the frame. In these grooves there are a considerable number of turns of wire indicated at 28, these being in this case thirty turns in a groove. The wood frame and the windings are shielded by a metal shielding 29 which is U shaped in section and thus fits over the outside of the frame, that is forming a covering for the exposed side of the grooves having the wire and at the sides. At one side however there is a break or open space 30 in the shielding. This is to prevent a closed circuit in the metal shield.

The manner of mounting of the transmitter loop to secure accurate adjustment as to relative angularity in relation to the receiver loop is shown particularly in Figs. 3 and 4 in which illustrations the frame 26 is illustrated as being mounted on horizontal pivots 31 in the side walls of the box. A bracket arm 32 is secured to the upper cross rail of the loop frame. This is threaded and through this extends a threaded screw 33. This screw extends through a journal 34 in the panel 17 and has an operating knob 35 on the outside. A compression spring 36 coiled on this screw and seated against the journal bearing 34 or the panel 17 and the bracket 32 maintaining a tight fit of the screw threaded connection. By this construction, although the boxes 14 and 15 are retained at a constant angle, one relative to the other, that is, the planes through these boxes are at right angles and hence the electrical equipment in the boxes is mounted in the same specific relationship in both the transmitter and the receiver, the transmitter loop may be adjusted through quite small arcs due to the screw 33 and the threaded bracket 32 giving a type of vernier adjustment. It is found that an adjustment of about five degrees on each side of the true right angular relationship of the loop in the receiver and that of the transmitter is usually satisfactory. In the receiver the loop antenna assembly designated by the numeral 40 is built into a fixed position in the receiver box. As above mentioned this loop antenna may be made up in the same way as the transmitter antenna and may or may not be shielded.

Dealing with the electric characteristics of our invention, it is desirable to develop in the transmitter an audio frequency envelope of considerable steepness (that is with high harmonic content) modulating the transmitter carrier wave. This might be accomplished by a number of different types of equipment, however some of these are too bulky and heavy for easy transportation to be carried by one person. We therefore employ a linear or class "B" amplification of a self modulated oscillator which provides a method of obtaining a radio frequency source of power, modulated by the desired steep wave form and of a suitable magnitude. This maye be obtained with power and voltage requirements readily within the weight and bulk limits of our manually portable apparatus. The transmitter circuit of Fig. 8 depicts suitable equipment. A triode tube 50 is operated as a self excited, self modulated oscillator whose circuit constants are such that modulation occurs at a rather low audio frequency (150 cycles approximately). 51 is a screen grid tetrode operating as a class "B" or linear amplifier. The use of a screen grid tube in this stage eliminates the need for neutralization of input admittance. A triode amplifier properly neutralized will also function satisfactorily. A tuned or tank circuit 52 employs the inductance 53 and capacitance 54. A grid leak condenser 55 and a grid leak resistor 56 control bias for the oscillator grid. The average plate current and audio interruptions rate are controlled by the time constant of the circuit of grid condenser 55 and resistor 56. The condenser 57 is an inter-stage coupling condenser. The radio frequency choke coil 58 is a means by which the grid of the amplifier is isolated from ground potential at radio frequency while the grid bias potential is establisehed. The condensers 59, 60 and 60' are radio frequency by-pass condensers. The antenna loop tuning condenser is indicated at 61. The loop antenna is designated by the numeral 62. This loop antenna with the tuning condenser 61 taken together form the plate tank circuit of the linear amplifier which is tuned to the same frequency as the oscillator tank circuit. The current supply is by the cathode heating battery 63. The batteries 64 and 65 are B batteries supplying the plate and screen potentials and the C battery 66 gives the bias for the amplifier.

In this diagram the shielding of the loop antenna is indicated by the dotted lines 70 in which there is a break 71 in the shield. The shielding is indicated as connected at 72 with a lead 73 to the cathode of the triode 50 and the cathode of the screen grid tetrode tube 51 and also having a connection to the negative side of the A and B batteries. The inductance 53 is also provided with a shield indicated at 74. This has a connection indicated at 75 and a lead 76 to the connecting lead 73 and thus provides the same connections as the shield of the antenna loop.

Electrical diagram of Fig. 9 of the receiving circuit illustrates a number of the features as being conventional, the receiving loop antenna is designated by the numeral 100 connected to the radio frequency amplifier 101 next the detector 102 and the audio frequency amplifier 103. The loop antenna is indicated as having the shield 104 with an open space 105, the shield being connected at 106 to the center tap leading to the radio frequency amplifier. With this circuit we employ a vacuum tube volt meter assembly 110 in which the tube 111 is located in one of the arms of a Wheatstone bridge 112. This bridge has the resistor 113 in one side, a variable resistor 114, a high resistance resistor 115 and the side 116 with the triode tube. The milliammeter 117 across the bridge is of low resistance. In the lead 118 is located a resistor 119 and the voltage across the terminals 120 and 121 is approximately 90 volts.

For use in an unbalanced condition with a constant initial signal impressed, the optimum value for the circuit constants found satisfactory are as follows, when using a type 19 tube, both sections in parallel, the resistor 113, 3000 ohms, 114, 1200 ohms; 115, 25,000 ohms, through the tube 111 in the side 116, the resistance is about 30,000 ohms, the milliameter 117 as above mentioned about 30 ohms and the resistor 119 about 2000 ohms. This arrangement is then adjusted by means of the input signal until the bridge is unbalanced to a point where the meter reads full scale or 1. m. a. Any increase in signal now causes deflection in a counter clockwise sense. If it is desired to use this circuit at balance and obtain readings with clockwise deflections, in the usual sense the following bridge constants provide a condition close to balance. The resistor 113, 1500 ohms, 114, 1000 ohms, 115, 25,000 ohms, the side 116 with the tube 111, 30,000 ohms, the milliammeter 117, 30 ohms, the resistor 119, zero, with the voltage across the 120 and 121 of 90 volts approximately.

This diagram presents the circuit for a vacuum tube volt meter giving high sensitivity for small voltages, it compensates for the residual plate current common to this class of volt meter and provides protection for the ammeter against overload. Also an initial constant signal may be compensated for and balanced out.

The type of tube with "zero cut-off" characteristic, that is, (i. e. it draws very low plate current when the grid is at zero bias) commonly employed for "class B" amplification, presents a very steep $E_g-I_p$ curve from the zero bias point to moderate negative bias values. Also this type of tube when employed in a grid rectification type of volt meter circuit assumes a value of plate current which is practically constant at a rather small value of impressed signal voltage. Further increase in signal voltage causes little change in plate current and this current is known as the residual plate current.

In the grid rectification type of circuit, bias is built up on the grid of the tube by the accumulation of charge or electrons acquired from the cathode-anode electron flow, during successive positive half cycles of the input signal. As this charge is built up, the grid repels the electrons of the cathode current with increased force, thus reducing the plate current of the tube and also reducing the amount of charge the grid acquires. When a negative grid potential is reached of sufficient value, relatively all cathode current electrons are repelled and the grid acquires only enough to compensate for leakage. This condition occurs leaving some cathode current flowing and represents a condition of approximate equilibrium between accumulation of grid charge and value of cathode current, which is essentially independent of increasing values of signal voltage. Thus, increasing signal voltage swings the grid more positive, accumulates higher charge, biases the grid more negative, reduces the plate current, however, only slightly for the grid was already negative to the point where it repelled all but a relatively few electrons and the further reduction of plate current results in reduction of the amount of electrons being accumulated to a point where balance is reached. Cathode-anode current flowing under such conditions is known as residual plate current.

In the combination of the above factors we have a grid rectification type of volt meter which will show relatively large change in plate current for small initial applied signal voltages but which plate current becomes practically constant for any signal voltage larger than some established value. These characteristics are controlled by the tube characteristics and operating potentials of the tube. By incorporating the cathode plate resistance of such a volt meter as one leg of a Wheatstone bridge and choosing proper constants for the other legs, the steep portion of the $E_g-I_p$ curve may be utilized to give high sensitivity and the residual plate current balanced out and used as a limiting value against overload.

This circuit is particularly valuable where low plate potential for the tube is a consideration. This type of volt meter gives readings proportional to the square of the effective value of the applied signal voltage for small signals while for larger signal voltages it becomes more nearly a peak volt meter. The circuit may be operated either with the bridge in balance or in unbalanced condition depending upon which sense it is desired to have the meter read.

In the instrument operating curve of Fig. 6 the abscissa 125 represents angular displacement of one loop antenna in reference to the plane or the axis of the other antenna and in this case as the transmitter antenna is illustrated as being angularly adjustable, the abscissa may be considered as graduated in angular degrees from the point 126 in which case the ordinate 127 graduated in relative volts indicates a position in which a minimum signal is registered in the receiver. The curve 128 thus represents the operating curve for the instrument. This curve has a zero or null point 129 which obtains with a certain orientation of the receiver and transmitter loops relative to each other. This angular adjustment is indicated by the diagram of Fig. 5 in which the null positions are indicated by the angle XY and Z. If this angle is reduced to produce the angle X, Y, Z' the response is indicated at some point such as 130 on the steep portion 131 of the operating curve. Then if any metallic body enters the field of the transmitter which lies below the XY axis of Fig. 5, the received signal is further increased and this increment is obtained on the steep portion of the operating curve of the instrument. We define the "plus null" adjustment as that relative orientation of the transmitter and receiver antenna which corresponds to the range of receiver response represented by that steep portion of the operating characteristic between points 130 and 132. If the angularity of the loop antenna of the transmitter is shifted to the opposite side of the angle XYZ, the instrument will operate on the side 133 of the curve 128. Some point of reception, such as 134, we designate as minus null adjustment.

The oscillogram diagram of Fig. 7 indicates the abscissa 150 as indicating time and the ordinate 151 in reference to the point 152 as representing voltage. The period of audio frequency is reached by the distance 153 between the repeating curves 154. It is to be noted that these curves have a steep wave front 155. Since the indicator for this instrument is operating as a half wave square low voltmeter which may vary to peak voltmeter characteristics, the harmonic content of the de-modulated audio signal effects the response curve. The higher the harmonic content the greater the deflection for a given signal voltage. The steeper the wave form the higher the harmonic content represented and this then provides one of the chief reasons for employing the type of transmitter used. While it is manifest that the wave form may be varied considerably, we have found by tests that a wave substantially of the form depicted is satisfactory.

We do not wish our invention to be limited to the circuits or types of instruments shown either in the transmitter or the receiver as we can develop a suitable wave form by other means.

In Fig. 10 we illustrate in cross section a convenient manner of attaching the handles to the case of the transmitter and receiver. Preferably a base block 160 which is provided with a pair of spaced V shaped grooves 161 is attached to the opposite sides of the transmitter and receiver case by screws 162 and the longitudinal bars 12 have a pair of projecting ribs 163 with a central groove 164. A screw bolt 165 is secured to the block 160 having the head countersunk and the ends of the arms have a longitudinal slot 166 so that the receiver and transmitter each with a screw bolt permanently attached may be readily secured to the bars or side arms of the frame 11 by slipping the bolt in the end of the slot 166 and then clamping by means of a thumb screw 167 which operates against a washer 168. An advantage of this construction resides in the interfitting of the complementary grooves and projections on the block fixed to the transmitter or receiver and the corresponding end of the side bars. Thus when the thumb nut is tightened there is no looseness to the connection of the two instrument boxes to the frame and thus they always have the same relative position. Moreover by making the bars 12 with the projections and grooves they are materially stronger for the same weight than a bar of rectangular cross section. This construction facilitates rapid assembly and disassembly of the receiver and transmitter units and the carrying handles.

Referring to the transmitter loop circuit of Fig. 11, this shows the loop circuit designated by the assembly numeral 175 which has a loop antenna 176 of low inductance, this being obtained by using fairly heavy wire and with a comparatively few turns on the loop. The tuning capacity 177 is high. The antenna thus has a low resistance. The rest of the antenna-energizing equipment, designated by the assembly numeral 180, may be in accordance with standard practice.

Figure 12:
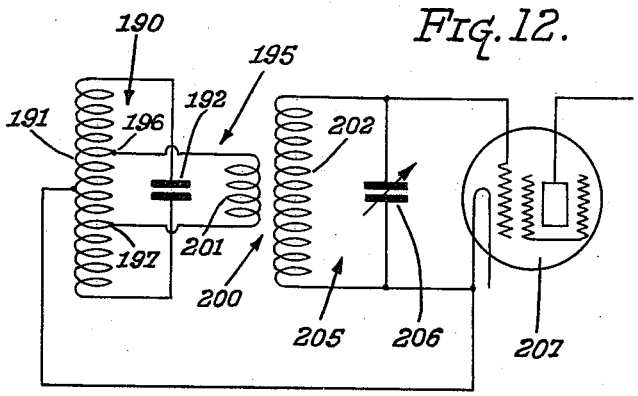
Fig. 12 is an electrical diagram of a receiving loop circuit also having the characteristics of high capacity and low inductance.

Fig. 12 illustrates an antenna loop circuit also of low inductance and high capacity in which the loop antenna circuit is designated by the assembly numeral 190. This has an antenna 191 of low inductance and also low resistance. The tuning capacity 192 is high. The transmission line circuit designated by the assembly numeral 195 has low impedance and is tapped to the loop at the points indicated at 196 and 197. Thus, there are only a few turns of the loop between these taps and therefore low impedance between such taps. The step-up transformer designated by the assembly numeral 200 has the untuned primary 201 which matches the impedance between the contacts 196 and 197. The tuned secondary 202 is part of a resonating circuit designated 205 in which there is a variable condenser 206. The output is led to the receiver amplifying or detector tube 207.

Figure 13:
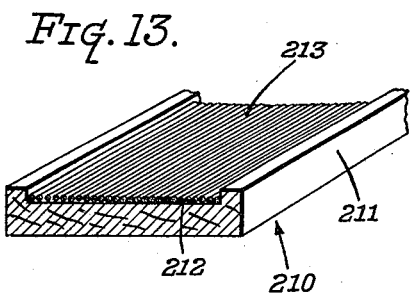
Fig. 13 is a partial perspective view of one form of winding the loop antenna, this being a type in which the wires are spread parallel to the axis of the loop.

Fig. 13 indicates one form of a loop winding, such loop being designated by the assembly numeral 210 in which there is a suitable frame 211 with a shallow trough or groove 212 in which the loops of the antenna indicated by the wires 213 are wound, whereby the series of wires at any diametrical section are parallel to the axis of the loop.

Figure 14:
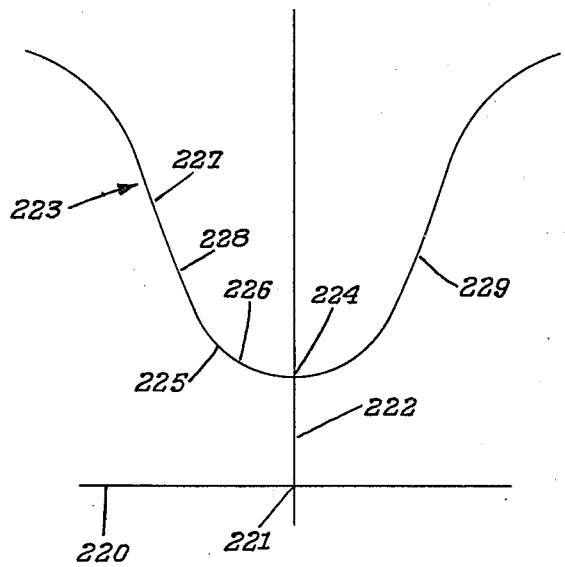
Fig. 14 is a diagram illustrating the instrument operating curve somewhat similar to Fig. 6, with the antenna of the type illustrated in Fig. 13.

The instrument operating curve for an antenna of the type of Fig. 13 is illustrated in Fig. 14 in which the abscissa 220 represents the angular displacement of one loop antenna with reference to the plane or axis of the other antenna. This abscissa may be considered as graduated in angular degrees from the point 221. The ordinate 222 is graduated in relative volts and indicates a position in which the minimum signal is registered in the receiver. The curve 223 thus represents the operating curve of the instrument and has a zero or null point 224 of a relatively high voltage value. The lower portion 225 of this curve illustrates the decided angular displacement that is necessary for a relatively small increase of relative volts. This operating curve may be considered as somewhat similar to that of Fig. 6 and the plus null portion of the curve may be designated as from the points 226 to 227 on the operating part of the curve 228. The point of least reception may be considered as null at point 224. A minus null would be on the opposite side 229 of the curve.

Figure 15:
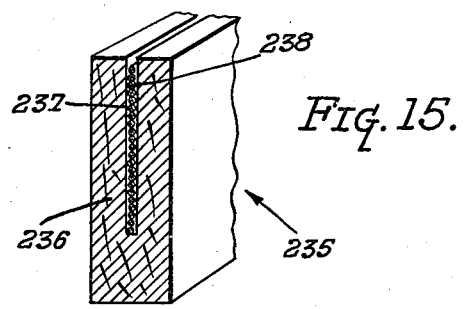
Fig. 15 is a perspective view of part of an antenna illustrating the winding of a flat or "pancake" type of loop.
Figure 16:
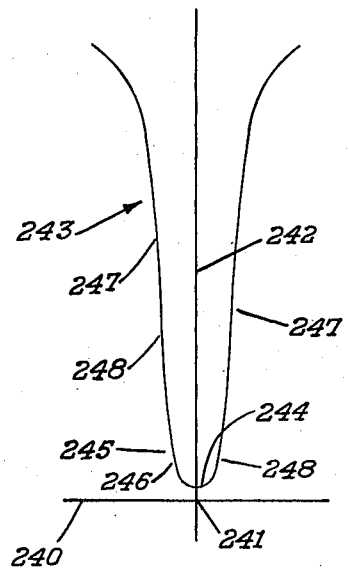
Fig. 16 is a diagram illustrating the instrument operating curve somewhat similar to Figs. 6 and 14, but using the type of loop of Fig. 15.

In Fig. 15 we illustrate a flat or "pancake" type of loop, the antenna assembly being designated by the numeral 235, this having a suitable frame 236 with a deep groove 237 extending radially towards the center of the loop. The windings 238 of the loop may be made of comparatively large wire and are thus wound in a plane transverse to the axis of the loop. This gives an operating curve somewhat as depicted in Fig. 16, which shows the abscissa 240 graduated from the point 241 in angular degrees and the ordinate 242 being graduated in relative volts. The operating curve 243 is thus quite steep and has its minimum or absolute null point 244 of comparatively low relative voltage. It will be seen by this curve that there is a rapid change of voltage compared with angular displacement indicated by the lower portion 245 of the loop. Thus, when using the "pancake" loop, the operating portion of the curve may be considered as from the point 246 to 247 using the portion of the curve 248. The point 246 may be considered as the plus null and is of low voltage. The opposite side of the curve indicated at 247 may be considered as minus null 248'. It will thus be seen that the type of loop of Fig. 15 produces an operating curve for use in this type of geophysical instrument which is of decided advantage due to more pronounced null and greater slope, thus small changes in the field patterns of the loops, cause rapid increment in the received voltage. Such a small change or changes in field pattern can result from (a) distortion due to the presence of a conductive body or (b) relative angular displacement of the loops.

Various changes may be made in the details of the construction without departing from the spirit or scope of the invention as defined by the appended claims.

We claim:

1. In a geophysical instrument, the combination of a radio transmitter and receiver, each being mounted in a case and each having a loop antenna, means to position the loop antennae at substantially a constant distance apart and at substantially right angles one to the other, at least one of such antennae being constructed to have a high distributed electrostatic capacity compared with variations in the capacity to the ground or surrounding objects.

2. In a geophysical instrument, described and claimed in claim 1, at least one of the antennae having electrostatic shielding forming a means for producing high constant electrostatic capacity.

3. In a geophysical instrument, the combination of a radio transmitter and radio receiver, each being mounted in a case and each having a loop antenna frame with a loop antenna mounted thereon, supporting and carrying handles secured in fixed relation to each case and positioning the plane of the antenna frames substantially at right angles one to the other, one of the antenna frames however being pivotally adjustable in its case, at least one of the antennae having the characteristics of high distributed electrostatic capacity compared with the capacity to the ground or surrounding objects and at least one of the loop antennae having metallic electrostatic shielding.

4. In a geophysical instrument, the combination of a box-like radio transmitter and radio receiver case connected at a fixed distance apart by a pair of carrying handles secured in fixed relation to each case, each case having a loop antenna frame with one or more grooves and each having antenna loops wound in the groove or grooves, at least one of the antennae loops having the characteristic of high distributed electrostatic capacity compared with the capacity to the ground or surrounding objects and at least one of such antennae loop frames having metallic electrostatic shielding with a break therein and each shield being grounded to its energizing circuit, the said antenna frames being located at substantially right angles one to the other but one of the frames being mounted for a pivotal movement in its case.

5. In a geophysical instrument as described and claimed in claim 4, the means for providing the pivotal movement comprising the transmitter antenna frame having a threaded bracket connected thereto, a screw threaded in said bracket and journalled in the case and having an operating knob positioned outside of the case and a spring reacting between the case and the antenna frame whereby a slight angular adjustment may be made of the said antenna frame.

6. A geophysical instrument comprising in combination a transmitter and receiver each with a resonating loop antennae circuit at least one of which includes an antenna loop of low inductance (L) and a condenser of high capacitance (C) to develop a low ratio of inductance divided by capacitance $$\frac{L}{C}$$

to the order of $$\frac{1000}{1} \text{ to } \frac{2000}{1}$$

HARRY A. FORE.
ALBERT K. EDGERTON.